US009365277B2

(12) United States Patent
Skrzypchak et al.

(10) Patent No.: US 9,365,277 B2
(45) Date of Patent: Jun. 14, 2016

(54) BATTERY CONNECTION SYSTEM FOR AN OUTBOARD ENGINE

(71) Applicant: BRP US INC., Sturtevant, WI (US)

(72) Inventors: Mark J. Skrzypchak, Pleasant Prairie, WI (US); Michael French, Pleasant Prairie, WI (US)

(73) Assignee: BRP US INC., Sturtevant, WI (US)

( * ) Notice: Subject to any disclaimer, the term of this patent is extended or adjusted under 35 U.S.C. 154(b) by 13 days.

(21) Appl. No.: 14/339,107

(22) Filed: Jul. 23, 2014

(65) Prior Publication Data

US 2016/0023740 A1    Jan. 28, 2016

(51) Int. Cl.
| | |
|---|---|
| B63H 21/21 | (2006.01) |
| H01R 13/46 | (2006.01) |
| B63H 20/32 | (2006.01) |
| B63H 20/14 | (2006.01) |
| F02N 11/14 | (2006.01) |

(52) U.S. Cl.
CPC ............... B63H 21/21 (2013.01); B63H 20/14 (2013.01); B63H 20/32 (2013.01); F02N 11/14 (2013.01); H01R 13/46 (2013.01); *B63H 2021/216* (2013.01)

(58) Field of Classification Search
CPC ......... B63H 21/21; B63H 20/32; F02N 11/14
USPC .......................................................... 440/83
See application file for complete search history.

(56) References Cited

U.S. PATENT DOCUMENTS

| | | | |
|---|---|---|---|
| 5,111,132 A | 5/1992 | Motose | |
| 5,234,363 A | 8/1993 | Motose | |
| 6,027,360 A * | 2/2000 | Jenkins | H01R 13/6215 439/248 |
| 6,045,411 A * | 4/2000 | Huber | H05K 5/0069 439/736 |
| 6,915,771 B2 | 7/2005 | Watanabe | |
| 2010/0045487 A1 * | 2/2010 | Bamba | B63H 21/213 340/984 |

OTHER PUBLICATIONS

U.S. Appl. No. 13/285,369, filed Oct. 31, 2011.
Evinrude® E-TEC®—2011 Predelivery and installation; BRP US Inc. Technical Publications; 2010; Cover page and pp. 1, 15-19; Waukegan, Illinois, United States of America.

* cited by examiner

*Primary Examiner* — Stephen Avila
(74) *Attorney, Agent, or Firm* — BCF LLP

(57) ABSTRACT

An electrical system for an outboard engine has a generator, a starter motor, a connector having first, second and third connector terminals, the first connector terminal being connected to the generator, the second connector terminal being connected to the starter motor, and the third connector terminal being connected to ground, and a cap connected to the connector. The cap has a first cap terminal connected to the first connector terminal and a second cap terminal connected to the second connector terminal. The first cap terminal is connected to the second cap terminal. An electrical system having a battery connected to the connector instead of the cap is also disclosed. An outboard engine having the system is also disclosed.

18 Claims, 9 Drawing Sheets

BATTERY CONNECTION SYSTEM FOR AN OUTBOARD ENGINE

FIELD OF TECHNOLOGY

The present technology relates to a system for connecting a battery to an outboard engine.

BACKGROUND

Marine outboard engines can typically be started using a recoil starter or using an electric starter. In outboard engines having a recoil starter, the user pulls on a rope which causes the engine's crankshaft to turn and which, if successful, permits the starting of the engine. In outboard engines having an electric starter, electric power is supplied to a starter motor which engages a gear connected to the crankshaft. As a result, the motor turns the gear, which turns the crankshaft, which permits the starting of the engine. Once the engine has started, the starter motor disengages the gear and power is no longer supplied to the starter motor. Some outboard engines having an electric starter are also provided with a recoil starter as a backup to the electric starter.

In marine outboard engines having an electric motor, a battery is connected to the starter motor in order to supply electric power to the starter motor. As the space inside the cowling of the outboard engine is limited, the battery is usually located outside of the cowling such as in the stern portion of the boat to which the outboard engine is mounted. As such, cables run from the battery to a control module inside the cowling. The control module is connected to the starter motor and controls the supply of electric power to the starter motor.

The engine of the outboard engine drives a generator, such as a magneto or an alternator, which generates electricity as it turns. This electricity is used to operate the various electric components of the engine, such as the fuel injectors and spark plugs, but also to recharge the battery.

Some boats propelled by an outboard engine are also provided with one or more other batteries to power various accessories of the boat such as, for example, a trolling motor, a fish finder, a GPS, live wells, a refrigerator, bilge pumps and a sound system. In such arrangements, the battery described above used for starting the engine is referred to as the primary or main battery and the one or more batteries used to power the accessories is referred to as auxiliary or house batteries. The auxiliary batteries are also sometimes used as a backup to the primary battery in order to supply power to the starter motor. The one or more auxiliary batteries are also disposed in the boat. In order to be recharged by the outboard engine, the one or more auxiliary batteries also have to be connected to the generator of the outboard engine.

In some outboard engines, the primary and auxiliary batteries are connected to a switch disposed in the boat and which is connected to the generator. The switch has three positions. In one position of the switch, only the primary battery is connected to the generator. This position is selected when starting the engine for example. In another position of the switch, only the auxiliary battery is connected to the generator. This position is selected when the engine is stopped and accessories need to be powered for example. In another position of the switch, both the primary and auxiliary batteries are connected to the generator. This position is selected when the engine is running, accessories need to be powered by the auxiliary battery and the primary battery needs to be charged for example. As such, the user needs to manually select the proper switch position. This could lead the user to select the wrong position resulting possibly in one or more of the batteries being drained.

In some outboard engines, a controller is associated with the switch to automatically select the proper position of the switch based on power requirements and charge levels.

Some outboard engines are only provided with the primary battery but provide the option of connecting an auxiliary battery. In one embodiment of such an outboard engine, the generator is connected to an engine management module (EMM) having a main output and an auxiliary output. The main output is connected to the primary battery via the starter motor. When no auxiliary battery is provided, the auxiliary output is connected to a first connector which is connected to a second connector which connects to the starter motor. In order to connect and auxiliary battery, the first connector is disconnected from the second connector and is instead connected to a third connector connected to the battery. As a result, the generator is connected to the auxiliary battery via the auxiliary output of the EMM and the first and third connectors. A cap is connected to the second connector.

Although the above facilitates the installation of an auxiliary battery, it has some inconveniences. The first and second connectors are disposed inside the engine compartment defined by the cowling of the outboard engine. Therefore, in order to disconnect the first connector from the second connector, the cowling needs to be removed at least in part in order to access the connectors. Also, the third connector needs to be routed through the cowling to the first connector. Also, the first, second and third connectors take up space in the already confined engine compartment. Finally, when the third connector is connected to the first connector when an auxiliary is provided, the second connector serves no function and just takes up space in the engine compartment.

Therefore, there is a desire for a system that facilitates the connection of an auxiliary battery to an outboard engine.

SUMMARY

It is an object of the present technology to ameliorate at least some of the inconveniences present in the prior art.

According to one aspect of the present technology, there is provided an electrical system for an outboard engine having a generator, a starter motor electrically connected to ground, a connector having first, second and third connector terminals, the first connector terminal being electrically connected to the generator, the second connector terminal being electrically connected to the starter motor, and the third connector terminal being electrically connected to ground, and a cap connected to the connector and covering at least the first and second connector terminals, the cap having first and second cap terminals, the first cap terminal being electrically connected to the first connector terminal, the first cap terminal being electrically connected to the second cap terminal, and the second cap terminal being electrically connected to the second connector terminal.

In some implementations of the present technology, a battery is electrically connected to the starter motor and the second connector terminal.

In some implementations of the present technology, an engine management module (EMM) is electrically connected to the generator and to the first connector terminal. The generator is electrically connected to the first connector terminal via the EMM.

In some implementations of the present technology, the EMM is electrically connected to the first connector terminal by a first connection. The EMM is electrically connected to the starter motor by a second connection.

In some implementations of the present technology, the generator is electrically connected to the starter motor via the EMM and the second connection.

According to one aspect of the present technology, there is provided an outboard engine having an internal combustion engine, a driveshaft operatively connected to and driven by the engine, a propeller shaft operatively connected to and driven by the driveshaft, a propeller connected to and driven by the propeller shaft, and the electrical system according to one of the above implementations. The generator is connected to and driven by the engine. The starter motor is selectively operatively connected to the engine for starting the engine.

In some implementations of the present technology, a cowling defines an engine compartment. The engine, the generator and the starter motor are disposed in the engine compartment. The connector and the cap are disposed outside the engine compartment.

In some implementations of the present technology, the cowling defines a rigging area. The connector and the cap are disposed in the rigging area.

In some implementations of the present technology, a battery is electrically connected to the starter motor. The battery is disposed outside of the cowling.

According to one aspect of the present technology, there is provided an electrical system for an outboard engine having a generator, a starter motor electrically connected to ground, an engine-side connector having first, second and third engine-side connector terminals, the first engine-side connector terminal being electrically connected to the generator, the second engine-side connector terminal being electrically connected to the starter motor, and the third engine-side connector terminal being electrically connected to ground, a battery-side connector connected to the engine-side connector and covering the first, second and third engine-side connector terminals, the battery-side connector having first and second battery-side connector terminals, the first battery-side connector terminal being electrically connected to the first engine-side connector terminal, and the second battery-side connector terminal being electrically connected to the third engine-side connector terminal, and a battery having a first terminal electrically connected to the first battery-side connector terminal and a second terminal electrically connected to the second battery-side connector terminal.

In some implementations of the present technology, the battery is a first battery. A second battery electrically connected to the starter motor.

In some implementations of the present technology, an engine management module (EMM) is electrically connected to the generator and to the first engine-side connector terminal. The generator is electrically connected to the first engine-side connector terminal via the EMM.

In some implementations of the present technology, the EMM is electrically connected to the first engine-side connector terminal by a first connection. The EMM is electrically connected to the starter motor by a second connection.

In some implementations of the present technology, the generator is electrically connected to the starter motor via the EMM and the second connection.

According to one aspect of the present technology, there is provided an outboard engine having an internal combustion engine, a driveshaft operatively connected to and driven by the engine, a propeller shaft operatively connected to and driven by the driveshaft, a propeller connected to and driven by the propeller shaft; and the electrical system according to one of the above implementations. The generator is connected to and driven by the engine. The starter motor is selectively operatively connected to the engine for starting the engine.

In some implementations of the present technology, a cowling defines an engine compartment. The engine, the generator and the starter motor are disposed in the engine compartment. The engine-side connector, the battery-side connector and the battery are disposed outside the engine compartment.

In some implementations of the present technology, the cowling defines a rigging area. The engine-side connector and the battery-side connector are disposed in the rigging area.

In some implementations of the present technology, the battery is a first battery. A second battery is electrically connected to the starter motor. The first and second batteries are disposed outside of the cowling.

According to one aspect of the present technology, there is provided a method for connecting a second battery to an outboard engine. The second battery has a first terminal electrically connected to a first battery-side connector terminal of a battery-side connector and a second terminal electrically connected to a second battery-side connector terminal of the battery-side connector. The outboard engine has an internal combustion engine, a driveshaft operatively connected to and driven by the engine, a propeller shaft operatively connected to and driven by the driveshaft, a propeller connected to and driven by the propeller shaft. A generator is connected to and driven by the engine. A starter motor is selectively operatively connected to the engine for starting the engine and electrically connected to ground. An engine-side connector has first, second and third engine-side connector terminals. The first engine-side connector terminal is electrically connected to the generator. The second engine-side connector terminal is electrically connected to the starter motor. The third engine-side connector terminal being electrically connected to ground. A cap is connected to the engine-side connector and covers at least the first and second engine-side connector terminals. The cap has first and second cap terminals. The first cap terminal is electrically connected to the first engine-side connector terminal. The first cap terminal is electrically connected to the second cap terminal. The second cap terminal is electrically connected to the second engine-side connector terminal. A first battery is electrically connected to the starter motor. The method comprises disconnecting the cap from the engine-side connector, and connecting the battery-side connector to the engine-side connector such that the battery-side connector covers the first, second and third engine-side connector terminals. The first battery-side connector terminal is electrically connected to the first engine-side connector terminal. The second battery-side connector terminal is electrically connected to the third engine-side connector terminal.

In some implementations of the present technology, the outboard engine also has a cowling defining an engine compartment and a rigging area. The cowling has a cover defining at least in part the rigging area. The engine, the generator and the starter motor are disposed in the engine compartment. The engine-side connector and the cap are disposed in the rigging area. The method further comprises removing the cover from a remainder of the cowling to reveal the rigging area prior to disconnecting the cap from the engine-side connector, and connecting the cover to the remainder of the cowling after connecting the battery-side connector to the engine-side connector.

According to one aspect of the present technology, there is provided an electrical system kit for connecting a battery to an outboard engine. The kit has an engine-side connector, a cap, and a battery-side connector assembly. The engine-side connector has first, second and third engine-side connector terminals. The first engine-side connector terminal is adapted for electrically connecting to a generator of the outboard engine. The second engine-side connector terminal is adapted for electrically connecting to a starter motor of the outboard engine. The third engine-side connector is adapted for electrically connecting to ground. The cap is adapted for connecting to the engine-side connector and for covering at least the first and second engine-side connector terminals. The cap has first and second cap terminals. The first cap terminal is electrically connected to the second cap terminal. The first cap terminal is adapted for electrically connecting to the first engine-side connector terminal. The second cap terminal is adapted for electrically connecting to the second engine-side connector terminal. The battery-side connector assembly has a battery-side connector, a first battery cable and a second battery cable. The battery-side connector is adapted for connecting to the engine-side connector and for covering the first, second and third engine-side connector terminals. The battery-side connector has first and second battery-side connector terminals. The first battery-side connector terminal is adapted for electrically connecting to the first engine-side connector terminal. The second battery-side connector terminal is adapted for electrically connecting to the third engine-side connector terminal. The first battery cable has a first end electrically connected to the first battery-side connector terminal and a second end adapted for electrically connecting to a first terminal of the battery. The second battery cable has a first end electrically connected to the second battery-side connector terminal and a second end adapted for electrically connecting to a second terminal of the battery.

For purposes of this application, terms related to spatial orientation such as forward, rearward, left, right, vertical, and horizontal are as they would normally be understood by a driver of the watercraft sitting thereon in a normal driving position with the outboard engine in an upright position and steered in a straight ahead direction. Also, for the purposes of this application, electrical values and measurements, such as for voltage and current, are to be understood, where appropriate, as nominal values and that operating values may vary. For instance, it will be appreciated that a fully charged "12-volt" battery is likely to have a potential difference of 13 to 14 volts. Similarly, a circuit meant for charging such a "12-volt" battery will typically provide 13 to 14 volts.

Embodiments of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
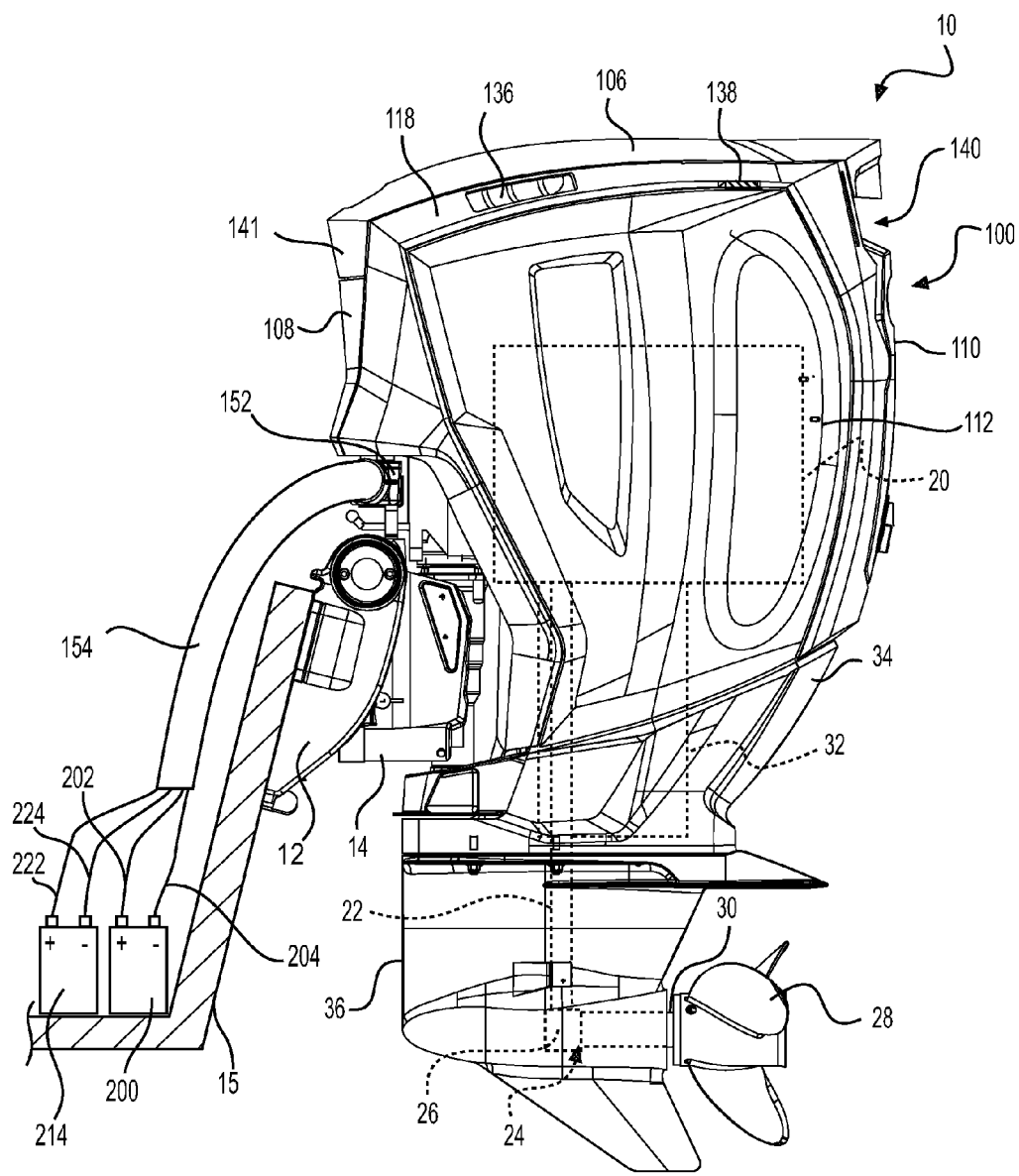
FIG. 1 is a left side elevation view of an outboard engine installed on a watercraft partially shown in cross-section.
Figure 2:
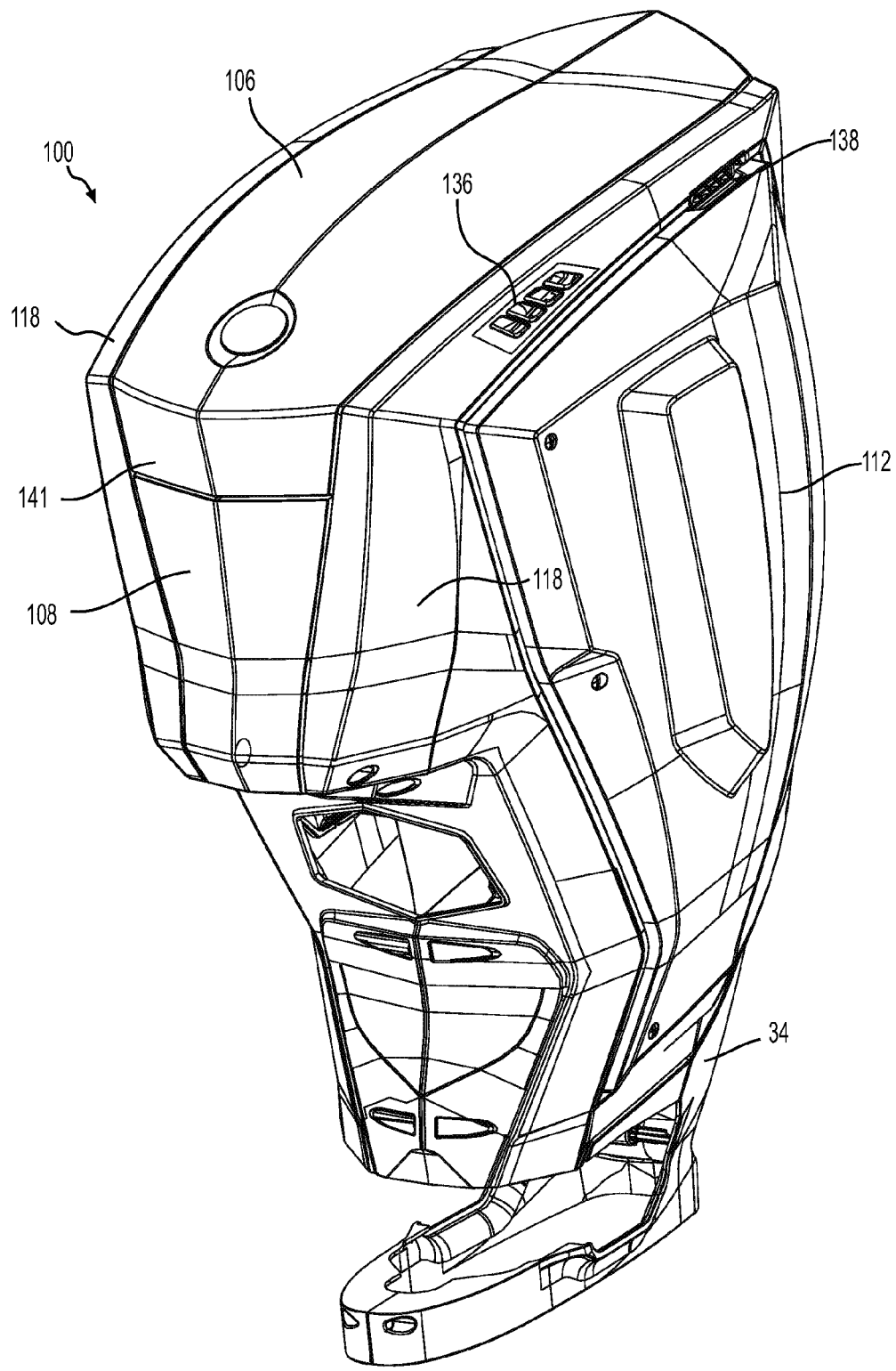
FIG. 2 is a perspective view taken from a front, left side of a cowling and midsection of the outboard engine of FIG. 1.
Figure 3:
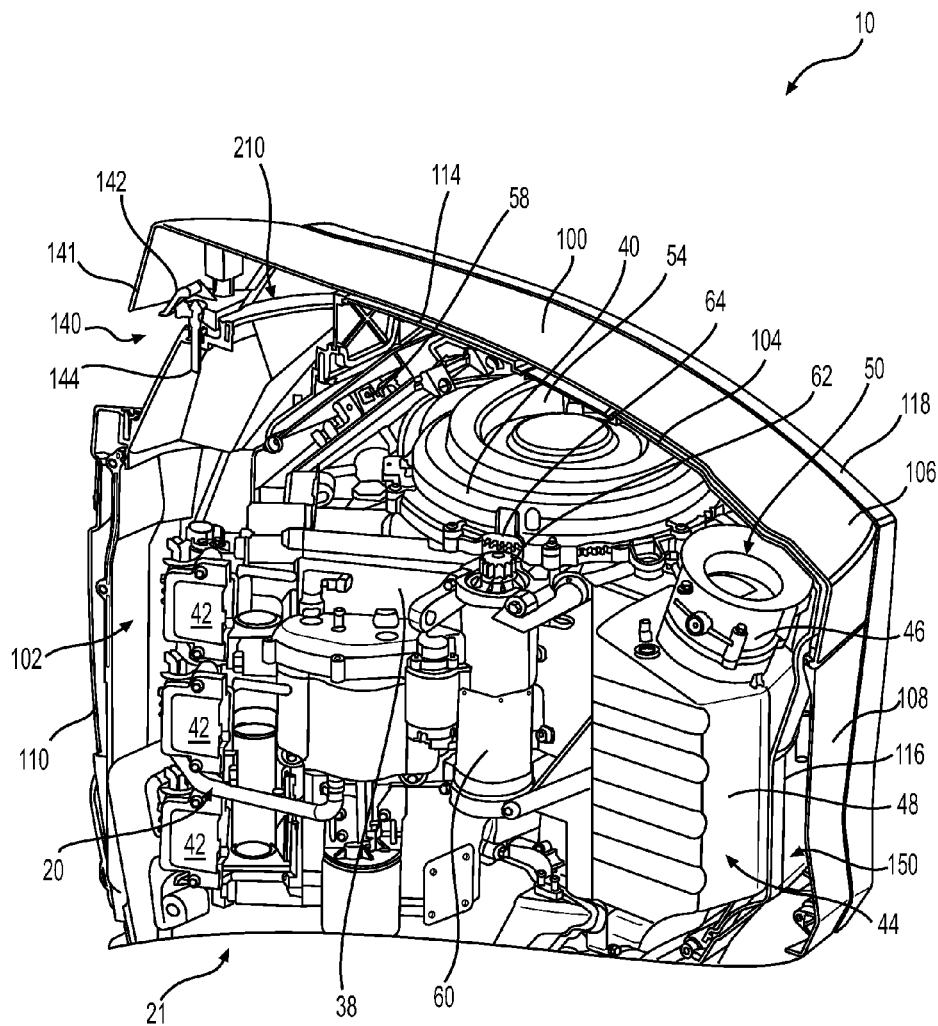
FIG. 3 is a partially cut-away perspective view, taken from a front, right side of a portion of the outboard engine of FIG. 1 with the right side of the cowling being cut away to show a power head, including an engine and a flywheel assembly, housed inside the engine compartment formed by the cowling.

With reference to FIGS. 1 to 3, an outboard engine 10 has a cowling 100 protecting an engine 20 (shown schematically in FIG. 1) and other components connected to the engine 20. The engine 20 and related components connected thereto are collectively referred to herein as a power head 21 (shown in FIG. 3).

The engine 20 is housed in an engine compartment 102 (FIG. 3) formed by the cowling 100. The engine 20 is a direct injection, two-stroke, V-type, six-cylinder internal combustion engine. It is contemplated that other types of engines could be used, such as, but not limited to, carbureted engines, semi-direct injection engines, or four-stroke engines.

As can be seen in FIG. 1, the outboard engine 10 is mounted to a transom of a boat by a mounting bracket assembly, including a stern bracket 12 and a swivel bracket 14. The swivel bracket 14 connects the stern bracket 12 to the cowling 100, and the stern bracket 12 mounts the outboard engine 10 to the transom of a boat 15. The swivel bracket 14 partly houses a steering shaft (not shown) of the outboard engine 10. The brackets 12, 14 can take various forms, the details of which are conventionally known and will therefore not be discussed further herein.

The engine 20 is coupled to a vertically oriented driveshaft 22 (shown schematically). The driveshaft 22 is coupled to a drive mechanism 24 (shown schematically), which includes a transmission 26 (shown schematically) and a bladed rotor, such as a propeller 28 mounted on a propeller shaft 30. The propeller shaft 30 is generally perpendicular to the driveshaft 22, but could be at other angles. The drive mechanism 24 could also include a jet propulsion device, turbine or other known propelling device. The bladed rotor 28 could also be an impeller. The drive mechanism 24 and a portion of the propeller shaft 30 are housed within a gear case 38 of the outboard engine 10.

An exhaust system 32 is connected to the engine 20. The exhaust system 32 is surrounded by the cowling 100. A lower portion of the exhaust system 32 is housed in a midsection 34 below the cowling 100 and above the gear case 36.

With reference to FIG. 3, the engine 20 has a cylinder block 38 with two banks of three cylinders arranged to form a V. It is contemplated that the cylinder block 38 could have more or less than six cylinders. It is also contemplated that the cylinders could have a configuration other than a V-formation. For example, the cylinders could be arranged inline, in which case the engine 20 would be an inline-type engine. A crankcase 40 is connected to the cylinder block 38. A crankshaft (not shown) is rotatably disposed inside the crankcase 40. The bottom end of the crankshaft extends out through a bottom wall of the crankcase 40 to be operatively connected to the driveshaft 22. Fuel injectors 42 supply fuel to the combustion chambers defined in the cylinders. Spark plugs (not shown) ignite the fuel-air mixture in the combustion chambers.

An air intake system 44, including a throttle body 46 and a plenum 48, is connected to the crankcase 40 to supply air for the combustion process. The throttle body 46 has a throttle body inlet 50. Air enters via the throttle body inlet 50 into the throttle body 46. A throttle valve regulates the amount of air flowing through the throttle body 46 into the plenum 48 and eventually into the combustion chamber of each cylinder.

A generator 52 (FIG. 8) and a flywheel (not shown) are located at the top end of the crankcase 40 and connected directly to the top end of the crankshaft of the engine 20. The generator 52 generates electricity as it turns during operation of the engine 20 as will be described below. A cover 54 is placed over the generator 52 and the flywheel.

An engine management module (EMM) 58 (FIG. 3) is disposed inside the engine compartment 102. The EMM 58 controls operation of the engine 20. The EMM 58 is in electronic communication with various sensors from which it receives signals, such as temperature sensors, pressure sensors, crankshaft position sensors and the like. The EMM 58 uses these signals to control the operation of the throttle valve actuator, the ignition system (not shown), and the fuel injectors 42 in order to control the engine 20.

The EMM 58 also controls the generation and supply of electrical power for the various components of the outboard engine 10 and some components of the boat 15 as will be described in greater detail below. It also contemplated that some functions of the EMM 58 could be split into multiple electronic components.

To start the engine 20, the EMM 58 causes power to be supplied to a starter motor 60 (FIG. 3) disposed inside the engine compartment 102. As can be seen in FIG. 3, the starter motor 60 is mounted to a right side of the engine 20. When power is applied to the starter motor 60, a gear 62 engages a ring gear 64 and the starter motor 60 drives the gear 62 that in turn drives a ring gear 64. The ring gear 64 is mounted to the flywheel. As the ring gear 64 is turned, the flywheel turns, which turns the crankshaft. As the crankshaft starts to turn, fuel is injected and ignited in the cylinders to cause the engine 20 to start. Once the engine 20 is started, power is no longer supplied to the starter motor 60, the gear 62 disengages the ring gear 64 and the starter motor 60 no longer drives the gear 62.

The configuration of the engine 20 and other components of the power head 21, as described above, is intended to be exemplary. The outboard engine 10 also has other components housed within the engine compartment 102, such as an oil filter, an oil pump, spark plugs and the like. As it is believed that these components would be readily recognized by one of ordinary skill in the art, further explanation and description of these components will not be provided herein.

As can be seen in FIGS. 1 to 7, the cowling 100 includes a support structure 104 (FIGS. 3 to 7)) and a plurality of panels 106, 108, 110, 112.

The engine 20 is connected to the support structure 104. The support structure 104 extends across portions of the front, the top and the back of the engine 20. A bottom of the support structure 104 is open, and connects to the exhaust system 32.

It is contemplated that the support structure 104 could (instead or in addition) be fixed to the swivel bracket 14 and/or the exhaust system 32. While it is possible to disconnect the support structure 104 from the engine 20, the support structure 104 stays fixed to the engine 20 during routine use.

The panels 106, 108, 110, 112 are removably connected to the support structure 104. The panels 106, 108, 110, 112 are a top cover or cap 106, a front cover 108, a rear (or back) cover 110, and left and right side panels 112. The panels 106, 108, 110, 112 are connected to an exterior of the support structure 104. The panels 106, 108, 110, 112 with portions of the support structure 104 form an outer surface of the cowling 100. The panels 106 and 112 provide access to different parts of the engine 20 when removed.

The support structure 104 is made of plastic. It is contemplated that the support structure 105 could be made of metal, of composite material or of a combination of various materials. The panels 106, 108, 110, 112 are each a single molded piece made of the same plastic as the support structure 105. It is contemplated that the panels 106, 108, 110, 112 could be made of a material other than the one of the support structure 104 and other than a plastic.

Figure 4:
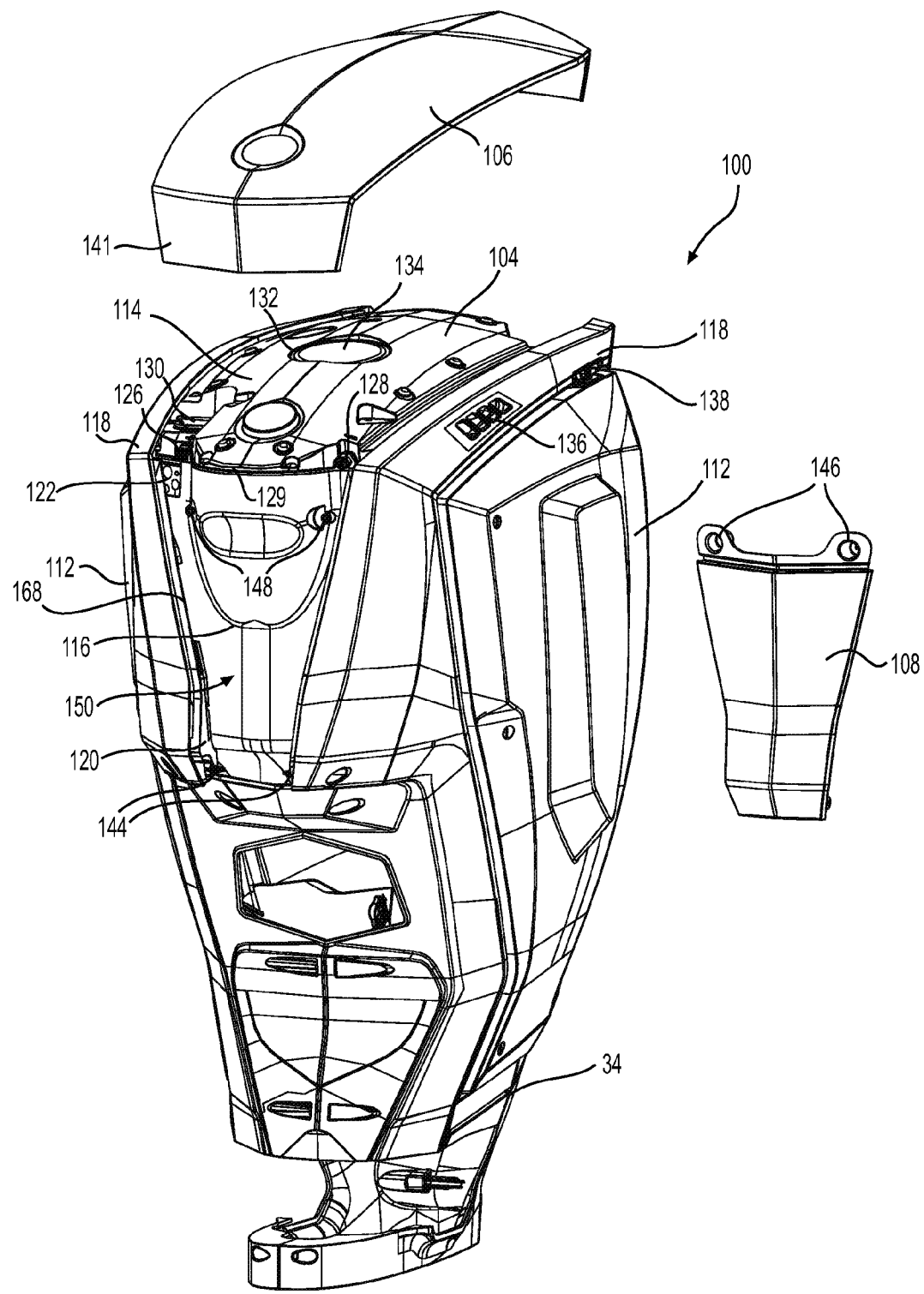
FIG. 4 is a partially exploded view of the cowling and midsection of FIG. 2.
Figure 5:
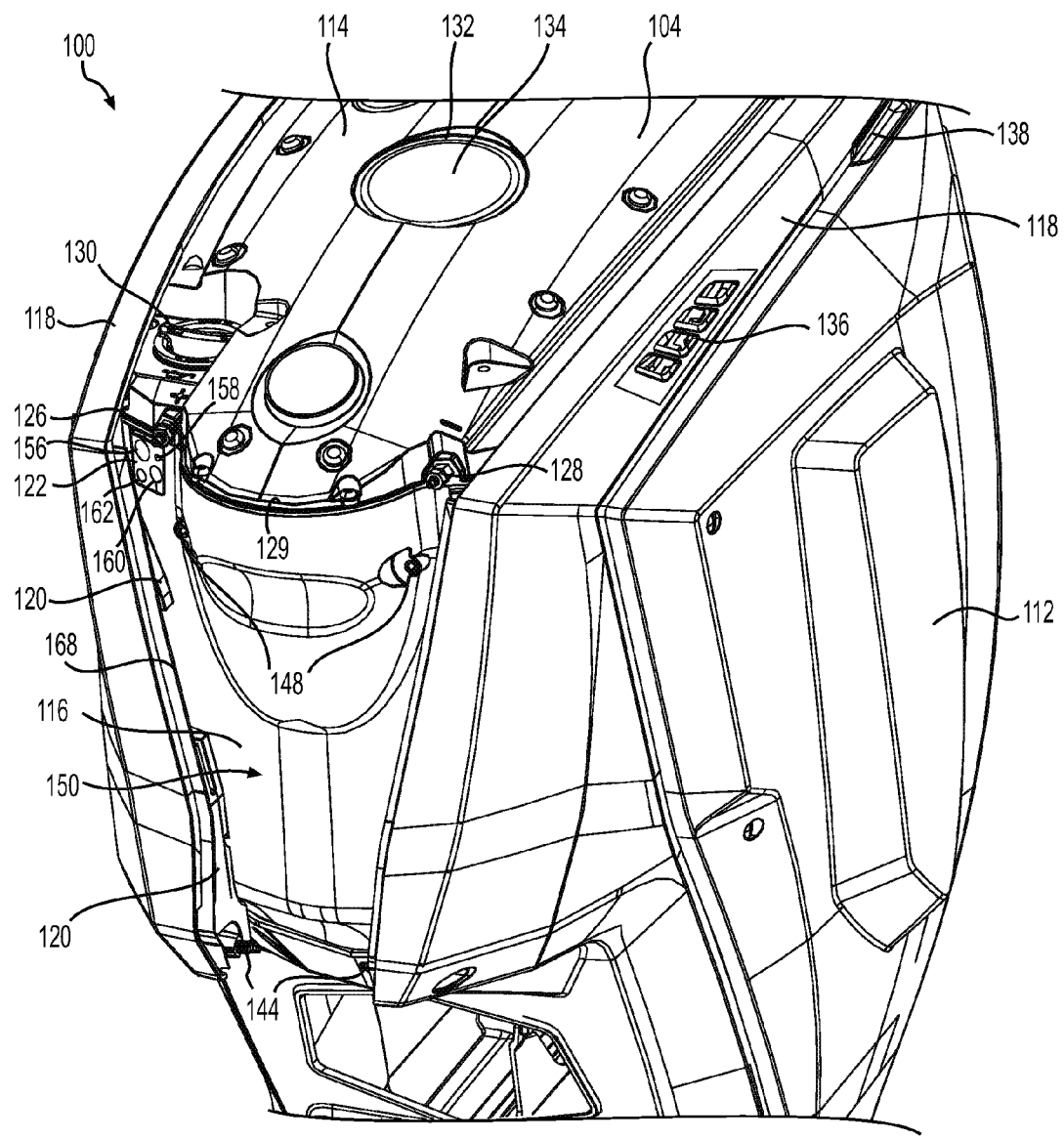
FIG. 5 is a close-up perspective view taken from a front, left side of an upper portion of the cowling of FIG. 2, with a top and front covers removed.
Figure 6:
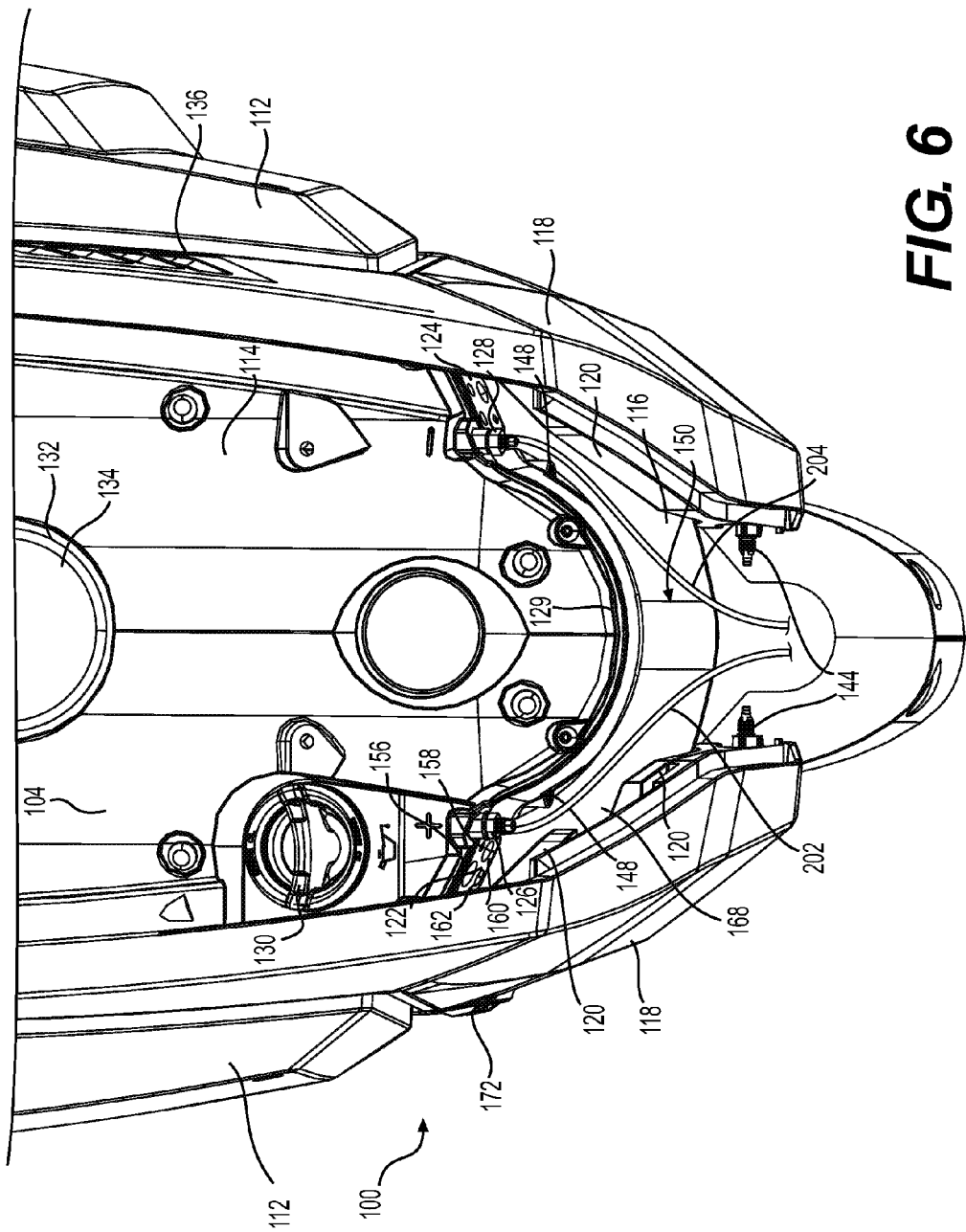
FIG. 6 is a top plan view of the front portion of the cowling of FIG. 2, with the top and front covers removed.

As can be seen in FIG. 4, the support structure 104 includes a central upper portion 114 and a central front portion 116 connected thereto. The support structure 104 also includes left and right panels 118 connected to the central upper and front portions 114, 116. Sound absorbing foam 120, some of which is shown in FIGS. 4 to 6, is disposed between the panels 118 and the portions 114, 116.

Right and left grommets 122, 124 are inserted in apertures in the front portion 116 of the support structure 104 near a top thereof. The grommets 122, 124 have four apertures to receive four lines. The lines can be electric lines (i.e. wires or cables), fluid lines (i.e. fuel lines, oil lines, hydraulic lines, etc.) or mechanical lines (i.e. push-pull cables and the like). The grommets 122, 124 permit the passage of the lines through the front portion 116, from components inside the engine compartment 102 to components outside the engine compartment 102. The grommets 122, 124 are made of a resilient material so as to reduce the entry of water inside the engine compartment 102. When the panels 106, 108 are removed from the cowling 100, the fronts of the panels 118 partially hide the grommets 122, 124 from view. The grommet 122 will be described in greater detail below.

Positive and negative battery connection terminals 126, 128 are provided in the front portion 116 of the support structure 104 near a top thereof. The battery connection terminals 126, 128 permit the connection of a battery 200 (FIG. 1) as will be described in greater detail below. The battery connection terminals 126, 128 are disposed on either side of a separating wall 129. The wall 129 helps prevent contact between the ends of the battery cables 202 and 204 (FIG. 6) during their connections to the battery connection terminals 126, 128 as will be described below.

An oil filling opening, closed by an oil cap 130 is provided at a front, right of the central upper portion 114 of the support structure 104. The oil filling opening permits the filling of the oil tank of the engine 20. An aperture 132 is provided in the central upper portion 114 to permit access to the top of the engine 20 for maintenance purposes. The aperture 132 is generally aligned with the crankshaft of the engine. A cap 134 closes the aperture 132 to prevent the entry of water in the engine compartment 102.

The left panel 118 defines air outlets 136 for expelling air from inside the cover 54. Both panels 118 define rear side air inlets 138 for supplying air to the throttle body 46. A main air inlet 140 is defined on a rear of the cowling 100 between the rear panel 110 and the top cap 106 for supplying air to the throttle body 46.

The panels 118 form side apertures that reveal portions of the power head 21. The portions of the power head 21 revealed by the side apertures are selectively covered by the side covers 112 secured by a plurality of connectors, such a quarter-turn screws. It is also contemplated that the side covers 112 could be mounted to the structural panels 118 via other means, for example by friction fit, snaps or latches. Water tight connection between the panels 118 and the side covers 112 is ensured by seals disposed on the side covers 112 and adapted to contact with rims of the lateral side apertures of the panels 118. The side covers 112 are larger than their corresponding lateral apertures of the panels 118 so as to cover a portion of the panels 118 and provide an additional barrier to prevent water from entering into the engine compartment 102. The left and right side covers 112 may be removed to access the power head 21 for maintenance and/or servicing. The left and right panels 118 are bolted to each other at various connection points in the front and the back. It is contemplated that the panels 118 could be secured to each other, other than by bolts, and that a seal could be disposed along the connection seam between the panels 118.

The top cap 106 covers the central upper portion 114, the aperture 132, the cap 134 and the oil cap 130. A downwardly extending front portion 141 of the top cap 106 also covers the grommets 122, 124 and the battery connection terminals 126, 128. The top cap 106 is removably attached to the support structure 104. As can be seen in FIG. 3, a latch 142 on the inner surface of the top cap 106 engages a post 144 extending from the upper central portion 114 to removably attach the top cap 106 to the support structure 104. The latch 142 can be accessed via the air inlet 140.

With reference to FIGS. 4 to 6, the front cover 108 is fastened to the central front portion 116 and each of the left and right panels 112. Fasteners 144 are inserted laterally into the panels 112 and the bottom of the front cover 108. Fasteners (not shown) are inserted into apertures 146 in the top of the front cover 108 and into apertures 148 in the central front portion 116. The front portion 141 of the top cap 106 is then attached over the front cover 108 by a pair of friction pins (not shown) and covers the fasteners inserted in the apertures 146, 148. The space defined between the front cover 108, the front portion 141 of the top cap 106 and the central front portion 116 is referred to herein as a rigging area 150 (FIG. 3). The rigging area 150 permits the passage of lines outside the engine compartment 102 and the connection between various lines outside the engine compartment while shielding and partially hiding these lines and connections. The bottom of the rigging area 150 is opened to permit the passage of the lines. As will be described below, the presence of such a rigging area 150 facilitates the rigging of the outboard engine 10 (the connection of lines between the outboard engine 10 and the boat 15 to which it is being mounted. It is contemplated that the rigging area 150 could be provided between other panels of the cowling 100 or could be a box mounted to the cowling 100.

The back cover 110 covers a rear portion of the vertical connection seam between the panels 118 so as to provide an additional barrier to water and external elements. The upper end of the back cover 110 is bolted to the rear wall of the upper central portion 114 and the lower end of the back cover 110 is clipped to the panels 118.

A rigging box 152 (FIG. 1) is mounted on top of the swivel bracket 14 below the rigging area 150. As the outboard engine 10 is tilted or trimmed, the rigging box 152 moves together with the swivel bracket 14 and the rest of the outboard engine 10. As the outboard engine 10 is steered, the rigging box 152 remains fixed to the swivel bracket 14 and the rest of the outboard engine 10, including the cowling 100, pivots relative to the rigging box 152. The rigging box 152 has a top opening (not shown), two side openings (not shown) and defines another rigging area therein. Lines, such as electrical cables or fluid lines, extend from a bottom opening of the rigging area 150, enter the rigging box 152 through the top opening of the rigging box 152, exit the rigging box 152 through one of the side openings of the rigging box 152 and then connect to a component in the boat 15. It is also contemplated that others lines, such as electrical cables or fluid lines, could extend from a bottom opening of the rigging area 150, enter the box through the top opening of the rigging box 152. These lines are then connected to other lines inside the rigging area of the rigging box 152 and these other lines exit the rigging box 152 through one of the side openings of the rigging box 152 and then connect to a component in the boat 15. Lines exiting the rigging box 152 through one of the side openings of the rigging box 152 are disposed inside a tube such as the tube 154 (FIG. 1). It is contemplated that the tube 154 could be omitted and that the lines could be bundled together by tie wraps for example.

It is contemplated that the rigging area 150 or the rigging area defined inside the rigging box 152 could be omitted.

Figure 7:
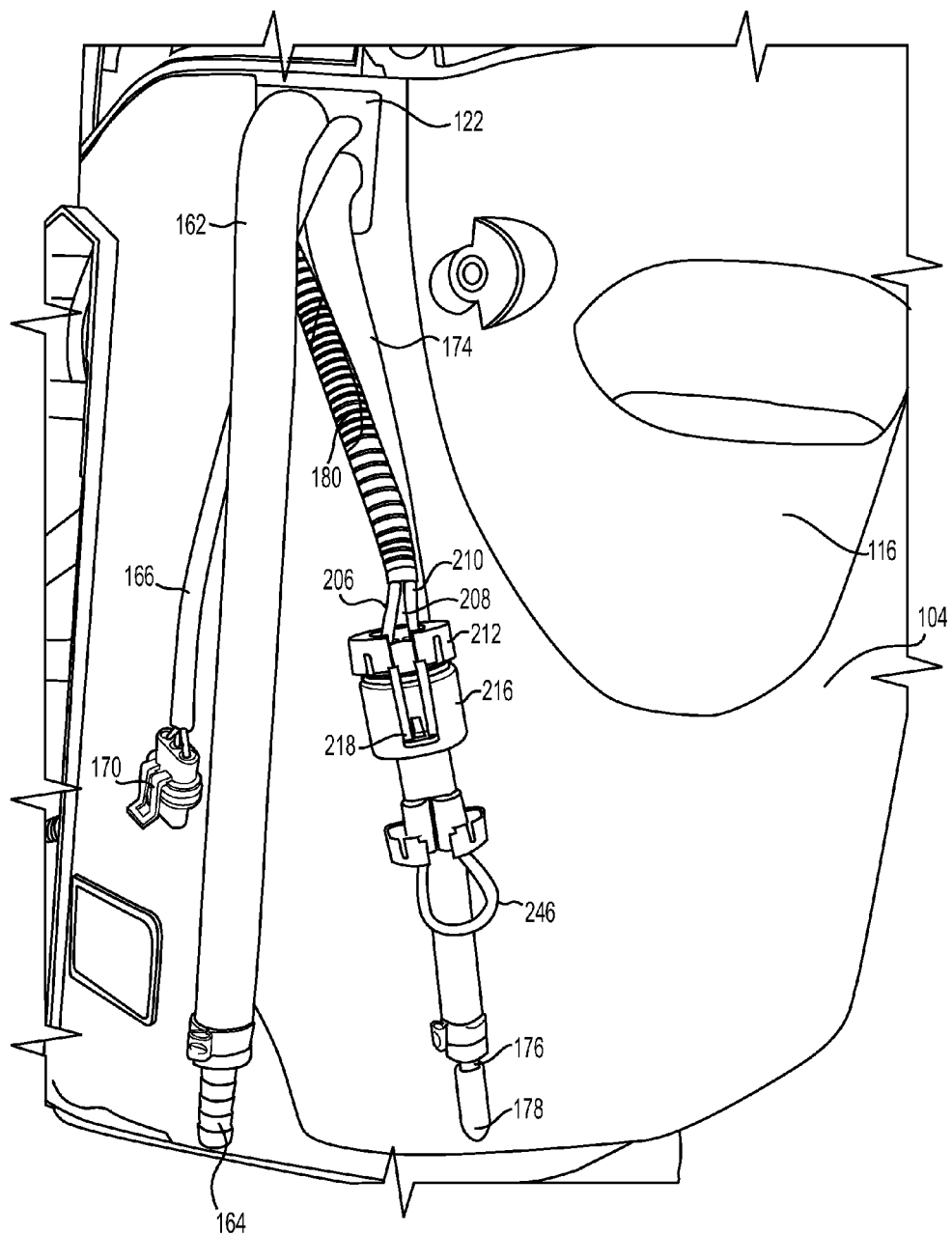
FIG. 7 is a perspective view taken from a front, right side of part of a front portion of a support structure of the cowling of FIG. 2 showing lines extending from a grommet of the cowling.

Turning now to FIGS. 6 and 7, the right grommet 122 and lines passing therethrough will be described. The grommet 122 has four apertures 156, 158, 160, 170.

The upper right aperture 156 has a fuel line 162 extending therethrough. A first end (not shown) of the fuel line 162 is connected to a fuel pump (not shown) of the engine 20 inside the engine compartment 102. From its first end, the fuel line 162 extends inside the engine compartment 102, passes through the aperture 156 of the grommet 122 and extends inside the rigging area 150. The second end of the fuel line 162 is disposed inside the rigging area 150 and is provided with a male connection fitting 164. A second fuel line (not shown) having a corresponding female connection fitting is connected to the male connection fitting 164 inside the rigging area 150. To connect the second fuel line to the fuel line 162, the covers 106, 108 first have to be removed to provide access to the rigging area 150. From its connection with the fuel line 162, the second fuel line extends out of the rigging area 150 through a bottom thereof, passes through the rigging box 152 and the tube 154 and then fluidly connects to a fuel tank (not shown) disposed inside the boat 15. It is contemplated that the second fuel line could extend through the other side opening of the rigging box 152.

The upper left aperture 158 has an electric cable 166 extending therethrough. A first end (not shown) of the electric cable 166 is connected to the EMM 58 inside the engine compartment 102. From its first end, the electric cable 166 extends inside the engine compartment 102, passes through the aperture 158 of the grommet 122 and extends inside the rigging area 150. From the rigging area 150, the electric cable 166 passes through a passage 168 (FIG. 6) defined in the foam 120 between the right panel 118 and the front portion 116 of the support structure 104. A second end of the electric cable 166 is provided with a tilt/trim switch connector 170. The tilt/trim switch connector 170 is connected to a tilt/trim switch 172 (FIG. 6) disposed on a front right side of the cowling 100. When a user actuates the tilt/trim switch 172, signals from the switch 172 are sent to the EMM 58 via the electric cable 166. The EMM 58 then sends signals to cause one or more hydraulic actuators to tilt or trim the swivel bracket 14 in response to the signals from the switch 172.

The lower left aperture 160 has auxiliary oil line 174 extending therethrough. A first end (not shown) of the auxiliary oil line 174 is connected to an oil pump (not shown) of the engine 20 inside the engine compartment 102. From its first end, the auxiliary oil line 174 extends inside the engine compartment 102, passes through the aperture 160 of the grommet 122 and extends inside the rigging area 150. The second end of the auxiliary oil line 174 is disposed inside the rigging area 150 and is provided with a male connection fitting 176. The auxiliary oil line 174 is used when an oil tank (not shown) is provided in the boat 15. Such an oil tank is usually provided inside the boat 15 when it would be inconvenient for the user to refill the oil tank of the outboard engine 20 via the oil filling opening, which is closed by cap 130, provided in the top of the support structure 104.

When no connection to an auxiliary oil tank is necessary, the male connection fitting 176 is closed by a cap 178 as shown in FIG. 7 and the auxiliary oil line 174 is routed between the right panel 118 and the front portion 116 of the support structure 104 so as to be at least partially hidden when removing the front cover 108 and to prevent the auxiliary oil line 174 from moving around inside the rigging area 150.

When an auxiliary oil tank is provided inside the boat 15, the cap 178 is removed and a second auxiliary oil line (not shown) having a corresponding female connection fitting is connected to the male connection fitting 176 inside the rigging area 150. To connect the second auxiliary oil line to the auxiliary oil line 174, the covers 106, 108 first have to be removed to provide access to the rigging area 150. From its connection with the auxiliary oil line 174, the second auxiliary oil line extends out of the rigging area 150 through a bottom thereof, passes through the rigging box 152 and the tube 154 and then fluidly connects to the auxiliary oil tank disposed inside the boat 15. It is contemplated that the second auxiliary oil line could extend through the other side opening of the rigging box 152.

The lower right aperture 162 has electric cables 206, 208, 210 extending therethrough. The electric cables 206, 208, 210 are disposed inside a sheath 180. First ends of the electric cables 206, 208, 210 are connected to components inside the engine compartment 102 as will be described below. From their first ends, the electric cables 206, 208, 210 extend inside the engine compartment 102, pass through the aperture 162 of the grommet 122 and extend inside the rigging area 150. The second ends of the electric cables 206, 208, 210 are disposed inside the rigging area 150 and are connected to an engine-side connector 212 also disposed inside the rigging area 150. It should be understood, that the term "engine-side" of engine-side connector 212 refers to the side of a connection provided by the connector 212 (i.e. it connects to components of the engine 20) and not to a particular spatial position of the connector 212. The auxiliary electric cables 206, 208, 210 and the engine-side connector 212 are used to facilitate the connection of an auxiliary battery 214 (FIG. 1) provided in the boat 15. Such an auxiliary battery 214 is usually provided inside the boat 15 when the boat 15 has accessories that need to be powered, such as a trolling motor, a fish finder, a GPS, a live well, a refrigerator, bilge pumps and a sound system for example. An auxiliary battery 214 can also be provided as a backup to the battery 200 used for starting the engine 20.

When no auxiliary battery 214 is provided, a cap 216 is connected to the engine-side connector 212 as shown in FIG. 7. The cap 216 is held in place by a clip 218 provided on the engine-side connector 212. The cap 216 is disposed inside the rigging area 150. The electric cables 206, 208, 210, the connector 212 and the cap 216 are arranged between the right panel 118 and the front portion 116 of the support structure 104 so as to be at least partially hidden when removing the front cover 108 and to prevent them from moving around inside the rigging area 150.

When an auxiliary battery 214 is provided inside the boat 15, the cap 216 is disconnected from the engine side connector 212 and a battery-side connector 220 (FIG. 9) is connected to the engine-side connector 212 inside the rigging area 150. The battery-side connector 220 is held in place by the clip 218 of the engine-side connector 212. The battery-side connector 220 is connected to two battery cables 222, 224 (FIG. 1). It should be understood, that the term "battery-side" of battery-side connector 220 refers to the side of a connection provided by the connector 220 (i.e. it connects to the battery 214) and not to a particular spatial position of the connector 220. To connect the battery-side connector 220 to the engine-side connector 212, the covers 106, 108 first have to be removed to provide access to the rigging area 150. The covers 106, 108 are then reconnected to the rest of the cowling 100 once the battery-side connector 220 is connected to the engine-side connector 212. The battery cables 222, 224 extend out of the rigging area 150 through a bottom thereof, pass through the rigging box 152 and the tube 154 and then connect to the auxiliary battery 214 disposed inside the boat 15. It is contemplated that the battery cables 222, 224 could extend through the other side opening of the rigging box 152. It is contemplated that the auxiliary battery 214 could not be disposed inside the boat 15. For example, the auxiliary battery 214 could be disposed on the stern or swivel brackets 12, 14. It is contemplated that the auxiliary battery 214 could be provided elsewhere outside of the engine compartment 102.

Figure 8:
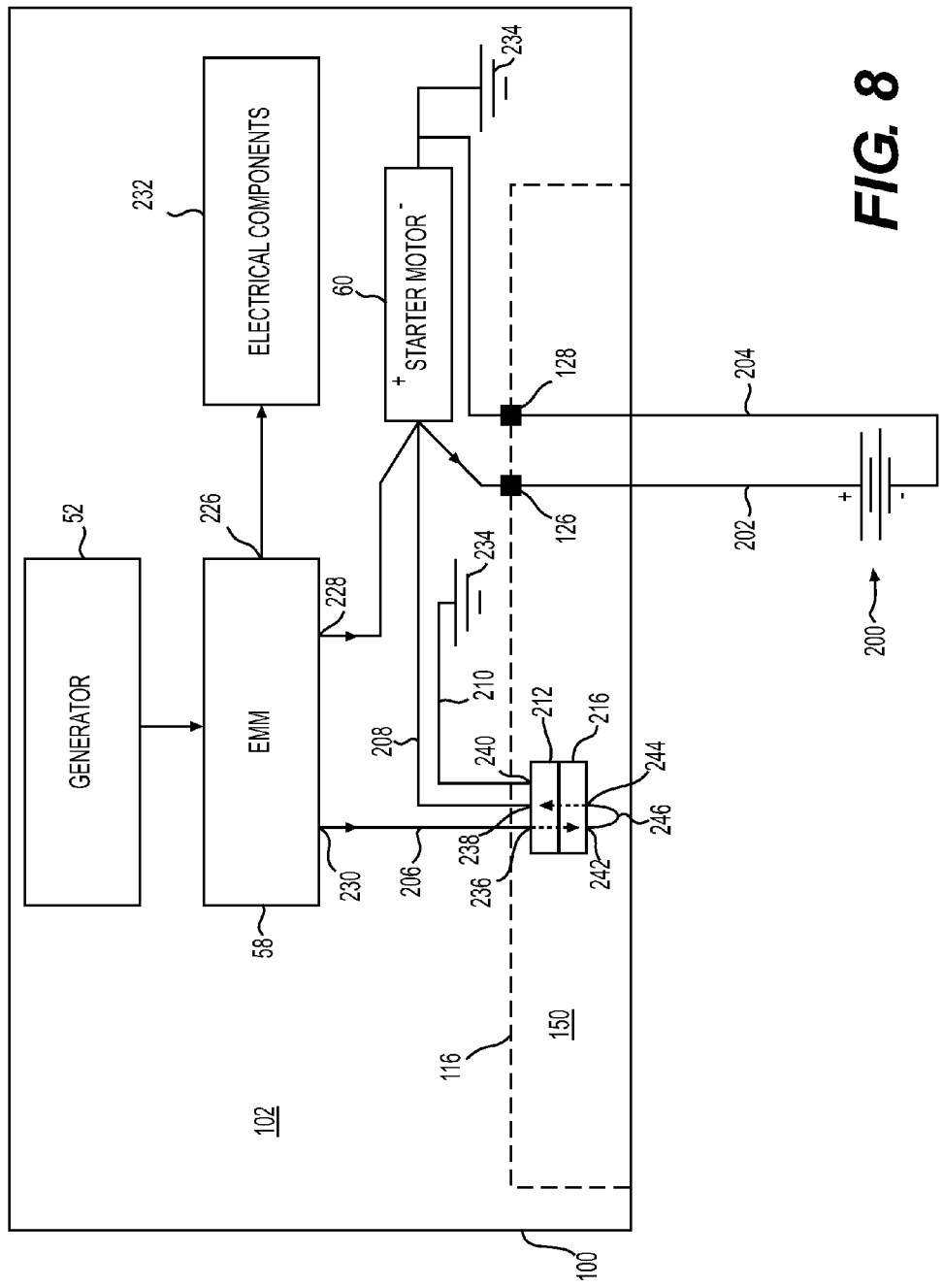
FIG. 8 is a schematic diagram of an electrical system of the outboard engine of FIG. 1 with a single battery connected thereto.
Figure 9:
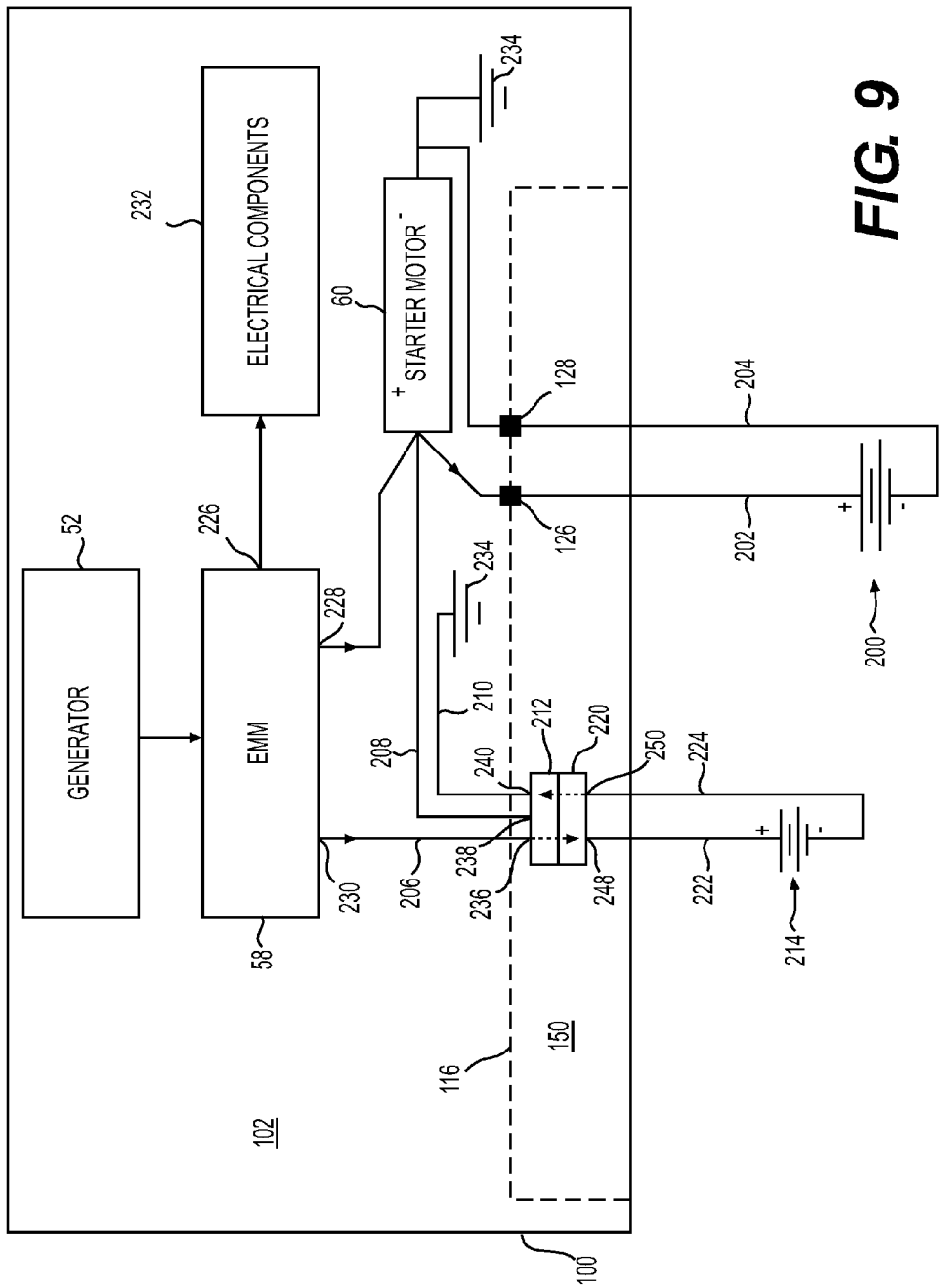
FIG. 9 is a schematic diagram of the electrical system of FIG. 8 with two batteries connected thereto.

Turning now to FIGS. 8 and 9, an electrical system for the outboard engine 10 will be described. The voltages (in volts, V) and amperages (in amperes, A) provided below are exemplary values of particular implementation of the electrical system. It should be understood that other values are contemplated. Also, ranges of amperages are provided below. It should be understood that the actual value of amperage within such a range at a particular time depends on the total power demand at that particular time or the power requirement of a particular connection at that particular time.

As can be seen in FIGS. 8 and 9, the generator 52 is electrically connected to the EMM 58 to supply direct current to the EMM 58. It is contemplated that the generator 52 could be a magneto or an alternator generating alternating current coupled to a rectifier converting the alternating current to direct current. Other types of generators, such as dynamos, are also contemplated. The generator 52 supplies up to 20 A of direct current at 55V. It is contemplated that the generator 52 could supply alternating current to the EMM 58 which would then integrate the functions of a rectifier in order to then supply direct current. The amount of power supplied by the generator 52 depends on the speed of rotation of the crankshaft of the engine 20 to which the generator is coupled. The EMM 58 divides the power received from the generator 52 between multiple ports 226, 228, 230.

The port 226 is representative of a plurality of ports that are electrically connected to a plurality of electrical components 232 of the engine 20 and other electrical components of the outboard engine 10. These include, but are not limited to, the fuel pump, the oil pump, the fuel injectors 42, the throttle valve and the hydraulic pumps for tilting, trimming and steering the outboard engine 10. The EMM 58 supplies up to 10 A of direct current at 12V to the electrical components 232 via the port 226.

The port 228 is electrically connected to the positive terminal of the starter motor 60 and to the battery connection terminal 126. The battery cable 202 is electrically connected at one end to the battery connection terminal 126 by a ring connector (not shown). It is contemplated that the ring connector could be replaced by any type of connector suitable to the type of battery connection terminal 126 provided. The other end of the battery cable 202 is electrically connected to the positive terminal of the battery 200. The battery cable 204 is connected at one end to the negative terminal of the battery 200. The other end of the battery cable 204 is electrically connected to the battery connection terminal 128 by a ring connector (not shown). It is contemplated that the ring connector could be replaced by any type of connector suitable to the type of battery connection terminal 128 provided. The battery connection terminal 128 is connected to ground 234 inside the engine compartment. The negative terminal of the starter motor 60 is also connected to ground 234. As such, the battery 200 can supply power to the starter motor 60 in order to start the engine 20. The EMM 58 supplies between 15 A and 25 A of direct current at 12V to the battery 200 to recharge the battery 200. It is contemplated that the battery 200 could also supply power to the EMM 58 via the port 228, or another port, for the EMM 58 to redistribute this power should the power generated by the generator 52 be insufficient. It is also contemplated that the battery 200 could be multiple batteries 200 connected in series or parallel. It is also contemplated that the battery connection terminals 126, 128 could be omitted. In one example of such an implementation, the battery cable 202 is connected between the starter motor 60 and the battery 200 and the battery cable 204 is connected between the battery 200 and ground 234. In this example, the battery cables 202, 204 pass through the front portion 116 of the support structure 104 and grommets are provided in the front portion 116 around the cables 202, 204.

As can be seen in FIGS. 8 and 9, the engine-side connector 212 has three engine-side connector terminals 236, 238, 240. The electrical cable 206 is electrically connected between the port 230 of the EMM 58 and the terminal 236. The EMM 58 supplies 25 A of direct current at 12V to the terminal 236. The electrical cable 208 is electrically connected between the terminal 238 and the positive terminal of the starter motor 60. Therefore, the terminal 238 is electrically connected to the positive terminal of the battery 200. The electrical cable 210 is electrically connected between the terminal 240 and ground 234.

As discussed above, when no auxiliary battery 214 is provided, as in FIG. 8, the cap 216 is connected to the engine-side connector 212. The cap 216 has two cap terminals 242, 244. The two cap terminal 242, 244 are electrically connected to each other by an electrical cable 246. As can be seen in FIG. 7, the cable 246 is disposed in part externally of the cap 216. It is contemplated that the two terminals 242, 244 could be connected to each other via a connection that is provided inside the cap 216. When the cap 216 is connected to the engine-side connector 212, the cap terminal 242 is electrically connected to the connector terminal 236 and the cap terminal 244 is electrically connected to the connector terminal 238. The cap 242 therefore provides an electrical connection between the port 230 of the EMM 58 and the positive terminal of the battery 200. As such, when no auxiliary battery 214 is provided and the cap 216 is connected to the engine-side connector 212, power from both ports 228, 230 of the EMM 58 is used to recharge the battery 200. In the present implementation, battery 200 can therefore be recharged by a direct current between 40 A and 50 A at 12V flowing from the battery connection terminal 126 to the positive terminal of the battery 200. In the implementation shown, the cap 212 covers all three terminals 236, 238, 240 of the connector 212. It is contemplated that the cap 212 could only cover the terminals 236, 238 of the connector 212.

As discussed above, when an auxiliary battery 214 is provided, as in FIG. 9, the battery-side connector 220 is electrically connected to the engine-side connector 212. Although not shown, the auxiliary battery 214 is electrically connected to electrical components of the boat 15 to supply power to them. In the present implementation, the auxiliary battery 214 is what is commonly referred to as a deep-cycle battery, but other types of batteries are contemplated. The battery-side connector 220 has two battery-side connector terminals 248, 250. The battery cable 222 is electrically connected between the terminal 248 and the positive terminal of the auxiliary battery 214. The battery cable 224 is electrically connected between the negative terminal of the auxiliary battery 214 and the terminal 250. The battery-side connector terminal 248 is electrically connected to the engine-side connector terminal 236. When the battery-side connector 220 is connected to the engine-side connector 212, the battery-side connector terminal 250 is electrically connected to the engine-side connector terminal 240. As such, the connectors 212, 220 provide an electrical connection between the port 230 of the EMM 58 and the positive terminal of the auxiliary battery 214 and an electrical connection between the negative terminal of the auxiliary battery 214 and ground 234. As such, when the auxiliary battery 214 is provided and the connectors 212, 220 are connected to each other, the auxiliary battery 214 is recharged by a 25 A direct current at 12V from the port 230 of the EMM 58 and the battery 200 is recharged by a 15 A to 25 A direct current at 12V from the port 228 of the EMM 58. The battery-side connector 220 covers all three terminals 236, 238, 240 of the engine-side connector 212. It is contemplated that the auxiliary battery 214 could be multiple auxiliary batteries 214 connected in series or parallel.

It is contemplated that the engine-side connector 212, the cap 216 and the battery-side connector 220 with the battery cables 222, 224 could be provided as a kit to be used for retrofitting the electrical system of outboard engines that do not have the electrical system described above. It is contemplated that the kit could also include the cables 206, 208, 210.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. An electrical system for an outboard engine comprising:
   a generator;
   a starter motor electrically connected to ground;
   a connector having first, second and third connector terminals, the first connector terminal being electrically connected to the generator, the second connector terminal being electrically connected to the starter motor, and the third connector terminal being electrically connected to ground;
   a battery electrically connected to the starter motor and the second connector terminal;
   an engine management module (EMM) electrically connected to the generator and to the first connector terminal, the generator being electrically connected to the first connector terminal via the EMM; and
   a cap connected to the connector and covering at least the first and second connector terminals, the cap having first and second cap terminals, the first cap terminal being electrically connected to the first connector terminal, the first cap terminal being electrically connected to the second cap terminal, and the second cap terminal being electrically connected to the second connector terminal.

2. The electrical system of claim 1, wherein the EMM is electrically connected to the first connector terminal by a first connection; and
wherein the EMM is electrically connected to the starter motor by a second connection.

3. The electrical system of claim 2, wherein the generator is electrically connected to the starter motor via the EMM and the second connection.

4. An outboard engine comprising:
an internal combustion engine;
a driveshaft operatively connected to and driven by the engine;
a propeller shaft operatively connected to and driven by the driveshaft;
a propeller connected to and driven by the propeller shaft; and
the electrical system of claim 1,
the generator being connected to and driven by the engine, and
the starter motor being selectively operatively connected to the engine for starting the engine.

5. The outboard engine of claim 4, further comprising a cowling defining an engine compartment;
wherein the engine, the generator and the starter motor are disposed in the engine compartment; and
wherein the connector and the cap are disposed outside the engine compartment.

6. The outboard engine of claim 5, wherein the cowling defines a rigging area; and
wherein the connector and the cap are disposed in the rigging area.

7. The outboard engine of claim 6, wherein the battery is disposed outside of the cowling.

8. An electrical system for an outboard engine comprising:
a generator;
a starter motor electrically connected to ground;
an engine-side connector having first, second and third engine-side connector terminals, the first engine-side connector terminal being electrically connected to the generator, the second engine-side connector terminal being electrically connected to the starter motor, and the third engine-side connector terminal being electrically connected to ground;
a battery-side connector connected to the engine-side connector and covering the first, second and third engine-side connector terminals, the battery-side connector having first and second battery-side connector terminals, the first battery-side connector terminal being electrically connected to the first engine-side connector terminal, and the second battery-side connector terminal being electrically connected to the third engine-side connector terminal; and
a battery having a first terminal electrically connected to the first battery-side connector terminal and a second terminal electrically connected to the second battery-side connector terminal.

9. The electrical system of claim 8, wherein the battery is a first battery; and
further comprising a second battery electrically connected to the starter motor.

10. The electrical system of claim 9, further comprising an engine management module (EMM) electrically connected to the generator and to the first engine-side connector terminal; and
wherein the generator is electrically connected to the first engine-side connector terminal via the EMM.

11. The electrical system of claim 10, wherein the EMM is electrically connected to the first engine-side connector terminal by a first connection; and
wherein the EMM is electrically connected to the starter motor by a second connection.

12. The electrical system of claim 11, wherein the generator is electrically connected to the starter motor via the EMM and the second connection.

13. An outboard engine comprising:
an internal combustion engine;
a driveshaft operatively connected to and driven by the engine;
a propeller shaft operatively connected to and driven by the driveshaft;
a propeller connected to and driven by the propeller shaft; and
the electrical system of claim 8,
the generator being connected to and driven by the engine, and
the starter motor being selectively operatively connected to the engine for starting the engine.

14. The outboard engine of claim 13, further comprising a cowling defining an engine compartment;
wherein the engine, the generator and the starter motor are disposed in the engine compartment; and
wherein the engine-side connector, the battery-side connector and the battery are disposed outside the engine compartment.

15. The outboard engine of claim 14, wherein the cowling defines a rigging area; and
wherein the engine-side connector and the battery-side connector are disposed in the rigging area.

16. The outboard engine of claim 15, wherein the battery is a first battery; and
further comprising a second battery electrically connected to the starter motor, the first and second batteries being disposed outside of the cowling.

17. A method for connecting a second battery to an outboard engine,
the second battery having a first terminal electrically connected to a first battery-side connector terminal of a battery-side connector and a second terminal electrically connected to a second battery-side connector terminal of the battery-side connector,
the outboard engine having:
an internal combustion engine;
a driveshaft operatively connected to and driven by the engine;
a propeller shaft operatively connected to and driven by the driveshaft;
a propeller connected to and driven by the propeller shaft; and
a generator connected to and driven by the engine;
a starter motor selectively operatively connected to the engine for starting the engine and electrically connected to ground;
an engine-side connector having first, second and third engine-side connector terminals, the first engine-side connector terminal being electrically connected to the generator, the second engine-side connector terminal being electrically connected to the starter motor, and the third engine-side connector terminal being electrically connected to ground;
a cap connected to the engine-side connector and covering at least the first and second engine-side connector terminals, the cap having first and second cap terminals, the first cap terminal being electrically connected to the first engine-side connector terminal, the first cap terminal being electrically connected to the second cap terminal, the second cap terminal being electrically connected to the second engine-side connector terminal; and a first battery electrically connected to the starter motor; the method comprising:

disconnecting the cap from the engine-side connector; and connecting the battery-side connector to the engine-side connector such that the battery-side connector covers the first, second and third engine-side connector terminals, the first battery-side connector terminal being electrically connected to the first engine-side connector terminal, and the second battery-side connector terminal being electrically connected to the third engine-side connector terminal.

18. The method of claim 17, wherein the outboard engine also has a cowling defining an engine compartment and a rigging area, the cowling having a cover defining at least in part the rigging area;

wherein the engine, the generator and the starter motor are disposed in the engine compartment; and wherein the engine-side connector and the cap are disposed in the rigging area;

the method further comprising:

removing the cover from a remainder of the cowling to reveal the rigging area prior to disconnecting the cap from the engine-side connector; and connecting the cover to the remainder of the cowling after connecting the battery-side connector to the engine-side connector.

* * * * *